United States Statutory Invention Registration [19]

[11] Reg. Number: H7

Martone [45] Published: Jan. 7, 1986

[54] EXPLOSIVE ORDNANCE DISPOSAL PROTECTIVE SUIT

[75] Inventor: Ralph Martone, Arlington, Mass.

[73] Assignee: The United States of America as represented by the Secretary of the Army, Washington, D.C.

[21] Appl. No.: 596,778

[22] Filed: Apr. 4, 1984

[51] Int. Cl.[4] ..... F41H 1/02

[52] U.S. Cl. ..... 2/2.5; 2/2; 2/6

[58] Field of Search ..... 2/2, 2.5, 6, 22, 23

[56] References Cited

U.S. PATENT DOCUMENTS

| | | | |
|---|---|---|---|
| 1,021,804 | 4/1912 | Schneider | 2/2.5 |
| 1,238,120 | 8/1917 | Flanagan | 2/2.5 |
| 1,269,930 | 6/1918 | Hawley | 2/2.5 |
| 1,333,438 | 3/1920 | Moore | 2/2.5 |
| 1,739,112 | 12/1929 | Wisbrod | 2/2.5 |
| 3,130,414 | 4/1964 | Bailey et al. | 2/2.5 |
| 3,573,150 | 7/1968 | Broutman et al. | 2/2.5 |
| 3,707,004 | 12/1972 | Kapitan et al. | 2/2.5 |
| 3,832,265 | 8/1974 | Denommee | 2/2.5 |
| 4,467,476 | 8/1984 | Herbert | 2/2.5 |
| 4,485,491 | 12/1984 | Rasmussen | 2/2.5 |

*Primary Examiner*—S. C. Buczinski
*Assistant Examiner*—Linda J. Wallace
*Attorney, Agent, or Firm*—Robert P. Gibson; Anthony T. Lane; Mark Goldberg

[57] ABSTRACT

An explosive ordnance disposal protective suit which includes trousers, a coat with collar, a protective helmet and a combination face shield-chest plate. The face shield-chest plate is supported and held in place by a pocket on the front of the coat. The chest plate is made of laminated layers of woven glass roving fabric. The face shield is a laminate of an optically clear polycarbonate sheet adhesively bonded to an optically clear acrylic sheet.

2 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EXPLOSIVE ORDNANCE DISPOSAL PROTECTIVE SUIT

The invention described herein may be manufactured, used, and licensed by or for the Government for governmental purposes without the payment to me of any royalty thereon.

BACKGROUND OF THE INVENTION

This invention is concerned with a bomb disposal clothing system designed to afford a wearer a maximum amount of protection against high velocity fragments and blast effects caused by exploding bombs. The wearer of this clothing system is engaged in the hazardous duty of deactivating and disposing of bombs and other dangerous munitions.

An explosive ordnance disposal protective suit must not only provide a high level of ballistic and blast protection but must also provide the wearer with a high degree of flexibility, mobility and manual dexterity. Other significant requirements include comfort, low weight, and resistance to formation of static electricity, magnetic charge or spark. The head protective gear must not restrict breathing, or impair the senses of sight, hearing or speech.

Prior explosive protective systems provided much less than the desired level of ballistic protection. Bomb fragments of various weights and velocities easily penetrated such systems. These suits proved to be extremely bulky, which greatly impaired the movement of the wearers. Suits in which the helmet and face shield constituted a single unit had the disadvantage of exerting a strain upon the wearer's neck and head when he leaned forward, tending to throw him off balance.

The protective clothing described herein address these and other deficiencies present in prior and currently available commercially manufactured bomb disposal armor systems. As will be explained further, an important element of the present invention is the use of a combined chest plate, face shield. However, to provide an effective level of protection, the entire system should be worn. The system consists of five major components: coat, trousers, helmet, helmet bonnet and one piece chest and face plate.

SUMMARY OF THE INVENTION

The present invention is for an explosive ordnance disposal protective clothing system consisting of a coat, trousers, helmet, helmet bonnet and one-piece breast plate and face shield. Ballistic inserts of ballistic protective materials are placed within the coat and trousers. The breast plate is supported and held in position by a pocket situated on the front of the coat. The combination breast plate and face shield provide a high level of protection through the use of a fiberglass-resin laminate in the breast plate portion and a transparent polycarbonate backed with acrylic material. Quick release straps together with hook and pile fasteners allow for ease in donning and doffing the coat and trousers.

DETAILED DESCRIPTION

Figure 6:
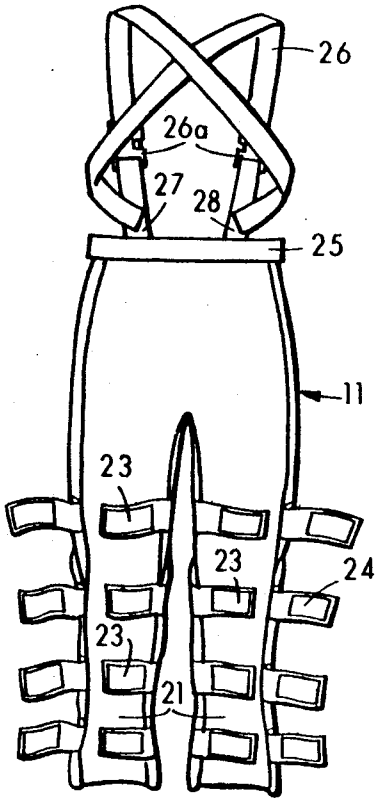
FIG. 6 shows a plan view of the back of the trousers.

The trousers 11 shown in FIG. 6 protect the front of the leg. The front portion of the trousers between the feet and the coat may be seen in FIGS. 1, 2, and 3. Leg closure strips 21 hold the trousers in position against the leg. Leg closure strips 21 are displayed in FIG. 6 with inside of leg and outside of leg strips having hook and pile bearing surfaces 23 and 24, respectively, which fasten together to hold the trouser 11 to the wearer's leg. Waist fastener belt 25 holds the trousers to the wearer at the waist. Suspenders 26 are attached at two points, 27 and 28 on the front of the waist of the trousers. Suspender straps cross in the back to form a scissors-type configuration and come around the wearer's side to be stitched to the back of the front straps. An adjustable buckle **26*a* with a squeeze-type quick release is attached to each of the two straps at a point above attachment points 27 and 28 to facilitate adjustment of the suspenders to the body size of the wearer. Trousers 11 are designed with a knee action system (shown by dotted lines in FIG. 1). The lower portion of the trousers 29, which extends from the top of the wearer's kneecap to the wearer's ankle, is tacked to upper portion 30 at two points on both sides of the knee as shown at 29*b*. This results in a hinged effect allowing the wearer to easily bend his knees for kneeling and squatting maneuvers. Ballistic protection is provided to the front of the legs by an inner layer of ballistic protective material. This protection is provided from a point about seven inches below the waist down to the ankles. At the bottom of each trouser leg is a spat 32 providing ballistic protection to the front of the ankle and the top of the foot. The same ballistic material used in the trousers is used in the spat. Spat 32, shown in FIGS. 1 and 2, comes with ankle strap 33, to go around the back of the leg and arch strap 34 to go around the arch of the wearer's footwear holding the spat in place. Located on spat 32 are hook surface areas 35 and 36 corresponding to pile surface areas on ankle strap 33 and arch strap 34**. When the hook surface areas are brought to contact with the appropriate pile fastener, the spat is held in place.

Figure 1:
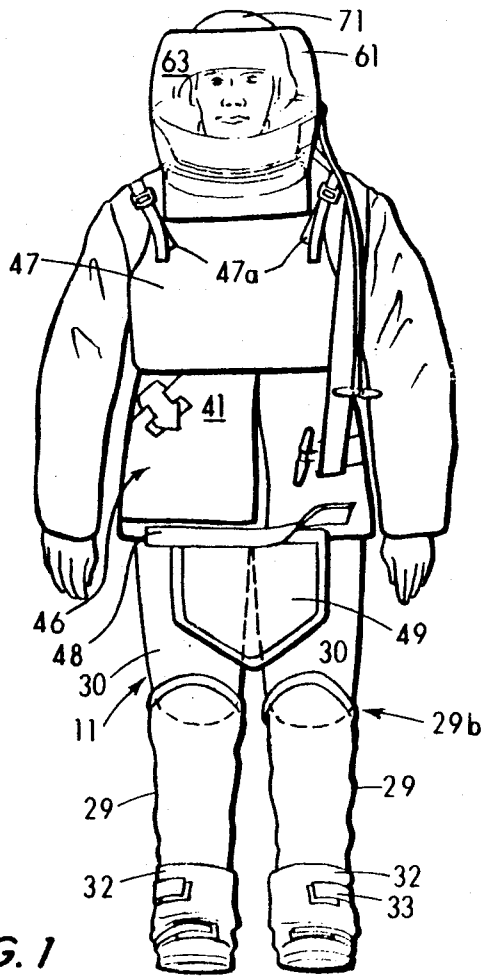
FIG. 1 shows a front plan view of the entire explosive ordnance disposal protective clothing system.
Figure 2:
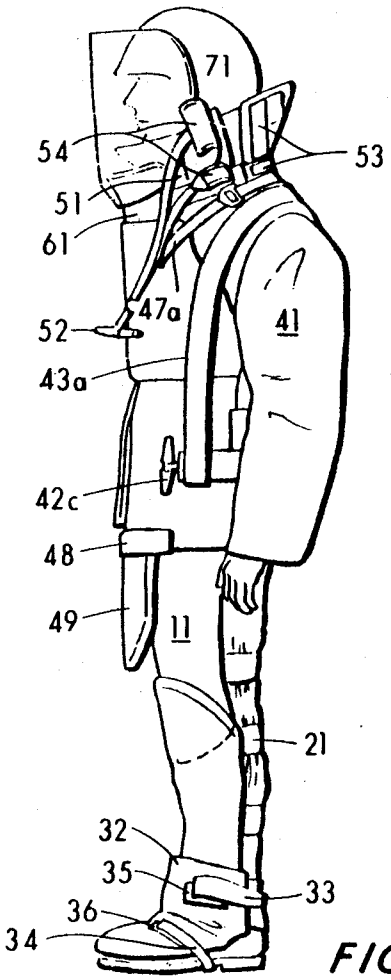
FIG. 2 shows a side view of the entire explosive ordnance disposal protective clothing system.
Figure 3:
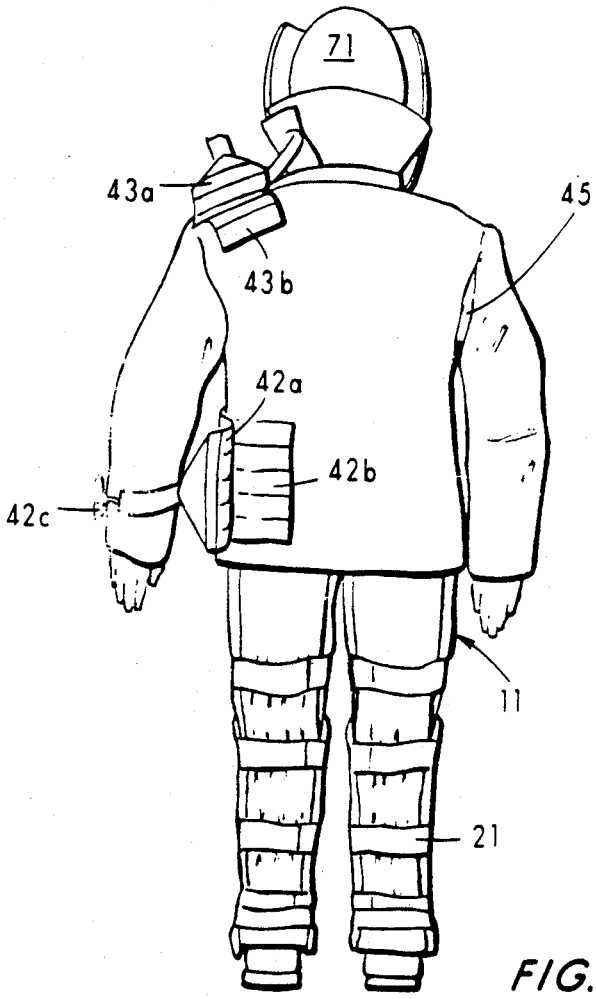
FIG. 3 shows a view of the back side of the wearer of the explosive ordance disposal protective clothing system.

Coat 41 as shown in FIGS. 1, 2, and 3 concentrates the ballistic protection to the front of the wearer. The coat protects its wearer between the mid-thigh and shoulders as well as protecting the arms. It is equipped with quick release, hook and pile fasteners on the left side and left shoulder areas respectively. The part of the back of the coat which comes around to the side and the part coming around to the left shoulder are equipped with large pile areas **42*a* and 43*a* as shown in FIG. 3 which match side release flap 42*b* and shoulder release flap 43*b*. The release flaps 42*b* and 43*b* are equipped with hook fastener areas which match the respective pile fastener areas 42*a* and 43*a*. Side release flap 42*b* is provided with toggle release mechanism 42*c* which when pulled causes the side release flap to separate from the pile areas for quick removal of the coat. The top of coat 41 is provided with a standup collar portion 44 (not shown) bearing pile fastener 44*a* (not shown) which matches a hook fastener surface on the underside of collar 51. The standup collar portion encircles the wearer's neck. Coat sleeves are unattached to the back of the arm holes portion of the coat to allow for greater range of motion of the wearer's arms as shown at 45, in FIG. 3. Pocket 46 on the lower right portion of coat 41 is for carrying tools. Breast plate pocket 47 on the chest area of coat 41 is adapted for carrying combination breast plate-face shield 61. Two breast plate adjustment straps 47***a* are provided with buckles which allow wearer to tighten straps and hold breast plate securely in position. Groin protector retainer strip 48 on coat is shown with removable groin protector 49 attached. Groin protector retainer strip 48 attached to coat 41 bears a hook surface while removable groin protector 49 bears a pile fastener surface. As shown in FIG. 1, removable groin protector 49 has a pentagonal configuration, protecting the groin and inner thigh region.

Detachable collar 51 protects the neck and lower part of the face. It contains ballistic inserts similar to those in coat and trousers. These inserts may be easily removed when it is desired to wash the collar. As in the coat, detachable collar 51 is equipped with a quick release mechanism whereby toggle 52 when pulled disengages pile and hook fasteners 53 and 54 attached respectively at opposite ends of the collar and adapted to be fastened together. The underside of collar 51 bears a hook fastener surface matching the pile fastener surface on standup collar portion 44 of the coat.

Figure 5:
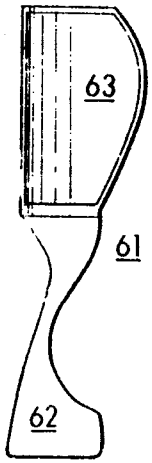
FIG. 5 shows a side view of the combination chest plate face shield.
Figure 4:
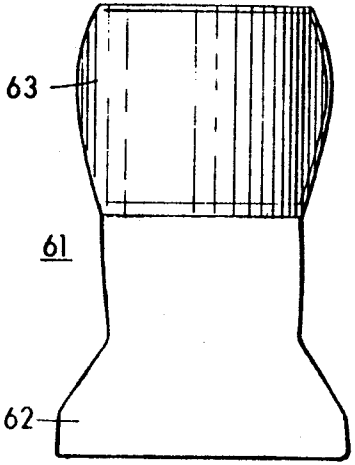
FIG. 4 shows a plan view of the front of the combination chest plate face shield.

The present invention employs a combination breastplate, face shield 61 shown as used in FIGS. 4 and 5. Breast plate portion 62 fits into and is held in place by pocket 47 on the coat. Face shield portion 63 is attached to the upper edge of breast plate 62 by conventional attaching means, such as bolts cooperating with nuts or screws. Face shield 63 is transparent. It has an acrylic-polycarbonate laminate structure with a curved contour to facilitate head movement. Breast plate 62 is molded to match the general contour of the chest and at its upper end extends away from the body in the area of the neck to deflect fragments away from that vulnerable region of the body. Since the breast plate is intended to protect the vital organs, it is designed to cover the front of the upper torso from approximately the chest diaphragm to the neck. The breast plate is composed of a molded fiberglass fabric/polyester resin composite having 18 plies of 24 oz/yd$^2$ fabric.

The wearer's protection is completed by a helmet 71 which is covered by a removable helmet cover or bonnet (not shown) which provides additional ballistic protection over that of the helmet alone. The bonnet fits closely to the surface of the helmet, and it is held in place through the use of a drawstring.

The fabric used for outer and inner surfaces in the coat and trousers, as well as in the helmet bonnet and collar, is an aromatic polyamide which exhibits an unusually high degree of stability when exposed to elevated temperatures. Characteristics of such polyamides include high melting points or lack of a melt point before thermal degradation. These polymers are highly resistant to flaming and are extinguished once the flame source is removed. Typically, these polymers are formed by copolymerizing aromatic diamines with dicarboxylic acids, e.g., metaphenylenediamine with isophtalic acid. Nomex, the fabric used in our coat and trousers, a product of E. I. DuPont de Nemours and Co., is but one example of a commercially available aromatic polyamide yarn which may be used. The Nomex fabric used was six ounces per square yard in inner and outer layers.

Ballistic protective inserts are put into the coat, trousers, collar, removable groin protector, spats and helmet bonnet. The ballistic material for the front, back and sleeves of the coat as well as the trouser legs are permanently attached between the outer and inner Nomex cover. The ballistic material is staggered at the side seams of the coat and under the seams of the sleeves in an alternating manner in order to conform to the anatomy so that when the garment is worn, puckers and pleats are not felt in the inside by the wearer. The ballistic material used is the aromatic polyamide known as "Kevlar" which is manufactured and sold by E. I. DuPont de Nemours & Co. The ballistic protective inserts are made of 16 plies of Kevlar fabric, 14 oz/yd$^2$. The helmet is the standard U.S. Army PASGT (Personnel Armor System for Ground Troops), helmet constructed from a laminated structure composed of resin coated Kevlar woven material bonded by heat and pressure. The helmet bonnet is made of the same fire resistant Nomex fabric used in the coat and trousers with an insert of 12 plies of Kevlar fabric, 14 oz/yd$^2$ for added ballistic protection for the head.

The face shield is made from clear optical quality polycarbonate and acrylic layers, laminated together with a UV stabilized polyurethane film. The optical quality acrylic sheeting is $\frac{3}{8}$ inch thick and faces outwards from the wearer. The acrylic used in the invention is $\frac{3}{8}$ inch thick Plexiglass II (preshrunk). The inner ply of the face shield is $\frac{1}{4}$ inch thick stabilized polycarbonate. A 0.060 inch thick polyurethane sheet adhesive formed the adhesive interlayer. The adhesive interlayer used was a thermoplastic urethane. The shield is symmetrical along its vertical axis. It provides blast and ballistic protection.

The chest plate is a fiberglass fabric, the plies of which are laminated with a polyester resin. The glass fabric used is a woven glass roving fabric manufactured from continuous glass roving in a plain weave pattern having a weight of 24 ounces per square yard. The individual glass filament is 0.00050 inch thick and the thread counts per inch in the warp is 5 and in the filling is 4 (2 picks per shed). The fabric has a nominal average thickness of 0.040± 10% inches and the breaking strength in pounds per inch of width in the warp is at least 1000 and in the filling is at least 800. Reference is also made to ASTM D2150-63T, Woven Roving Glass Fabric for Polyester Glass Laminates (incorporated herein by reference), for additional information with respect to woven, roving glass fabrics.

The other component of the laminate is a liquid bonding resin which is subsequently heat cured to a solid state and consists of a solution of unsaturated polyesters in monomeric styrene and contains from 0.5% to 1.0% methacrylic acid. Suitable polyester resins are well known and readily available. In general, they are additive type resins formed by the reaction of polycarboxylic acids and polyols. Resins which meet the foregoing description include the Paraplex P resins, a product of Rhom and Haas Co., Philadelphia, Pennsylvania, and essentially noteworthy is a blend of three parts of Paraplex P-43 and one part Paraplex P-13. The polyester resin shall contain from 70% to 85% by weight of thermosetting polyester content and from 15% to 30% by weight of monomeric styrene.

In constructing the laminate, the individual plies of fabric material are coated on each side with sufficient polyester resin solution to produce a laminate containing from 20% to 25% by weight of polyester resin. After the resin-coated plies are stacked together in the desired arrangement, they are inserted in a mold and heated to a temperature of from 270° F. to 300° F. to cure the resin and subjected to a pressure of from 50 p.s.i. to 300 p.s.i. to obtain a dense laminate and to obtain the desired configuration. While the timing required to cure will vary with the resin and thickness of the laminate, it will generally range from about 5 minutes to about 30 minutes. Any molding system capable of applying heat and pressure in the range set forth above may be used in forming the laminate. To achieve this weight approximately 18 layers of the glass fabric will be used with the plate having a resin content in the range of 22%. An alternative to the glass fabric would be to use an aromatic polyamide laminate ballistic material such as that used in the ballistic inserts.

The present invention provides advantages over prior art explosive ordnance disposal protection clothing systems by offering the ballistic protection needed while retaining a high degree of maneuverability and comfort for the wearer. The unique one piece face shield, chest plate allows air to flow past the wearer's face, reducing any visibility problem caused by fogging of the face shield. Unlike some other prior art suits the invention may be worn without an air supply unit. In addition, the weight of the face shield is carried by the chest pocket an area of the body more capable of bearing the weight, instead of by the head and neck muscles which are more inclined to fatigue. The helmet and helmet bonnet provide protection to the head area in addition to that given by the face shield. Furthermore, the protective suit is easily donned and doffed. It will prove useful to both soldiers and civilians engaged in the dangerous occupation of bomb disposal.

It will be understood, of course, that various changes in the details and materials which have been described in order to explain the nature of the invention, may be made by those skilled in the art within the principle and scope of the invention. For example, whenever a hook and pile fastener combination is shown, the hook and pile surfaces may be reversed or other fastening means may be employed. An aromatic polyamide laminate ballistic material such as Kevlar may be substituted for the laminated fiberglass used in the chest plate. Other ballistic fabrics capable of being molded to the appropriate configuration and capable of providing the desired level of ballistic protection may also be used.

I claim:

1. A combination breast plate and face shield providing protection to the frontal aspect of the upper torso and face of the wearer, comprising a rigid, transparent, ballistic and blast protective face shield fixedly attached to the top of said breast plate; wherein said breast plate is curved to approximately match the curvature of the front of the upper torso of a human wearer, extending under the arms of the wearer to afford protection to the upper torso from approximately the chest diaphragm to the neck of the wearer; and wherein said face shield is adapted to cover the front of the remainder of the neck and the face of the wearer, and is spaced away from the wearer's head to allow a full range of head movements without the head contacting the face shield; said breast plate being supported against the upper torso of the wearer by a support means on the front of a coat covering the wearer's torso, said support means comprising a pocket extending across the front of said coat; and wherein said face shield comprises a laminate of an optically clean polycarbonate sheet adhesively bonded to an optically clear acrylic sheet and said breast plate is a laminate of resin impregnated fiberglass.

2. Protective clothing providing protection for a human wearer against high velocity fragments and blast effects caused by exploding bombs comprising:

(a) trousers, said trousers containing ballistic protective inserts protecting the front of the body of the wearer;

(b) a detachable collar containing ballistic inserts;

(c) a protective helmet;

(d) a ballistic and blast protective breast plate-face shield combination, wherein said breast plate covers the front of the wearer from approximately the level of the diaphragm to the neck and said face shield covers the remainder of the wearer's neck and the face, said face shield being spaced from the face of the wearer to allow the wearer to make head movements without contacting the face shield, and (e) a coat, the front of said coat having a pocket which supports the breast plate against the upper torso of the wearer and thereby positions and holds the face shield in front of the face of the wearer.

* * * * *